Sept. 18, 1928.  1,685,013
P. ABRECHCINSKI
AUTOMOBILE TIRE
Filed Aug. 18, 1927
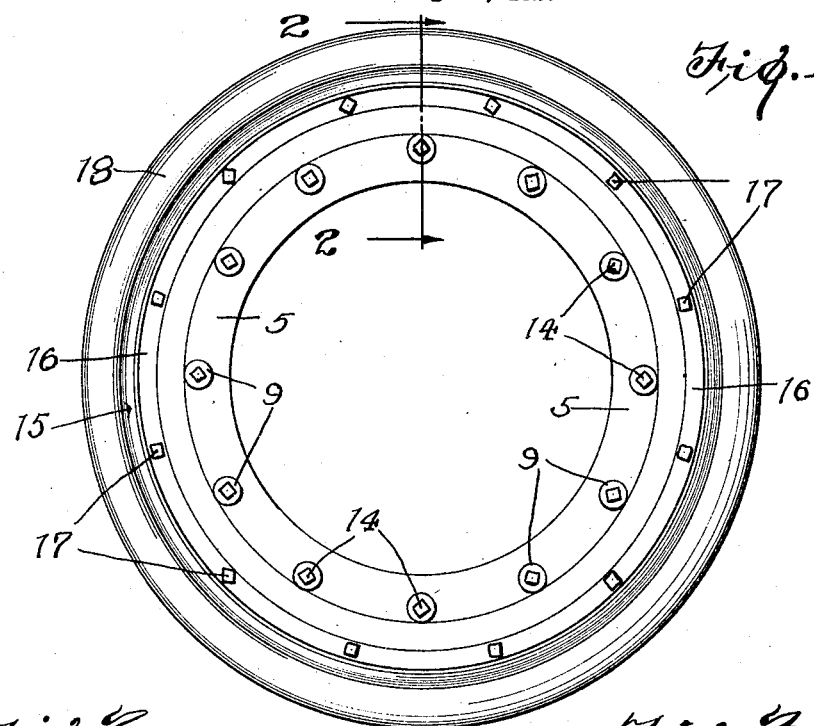
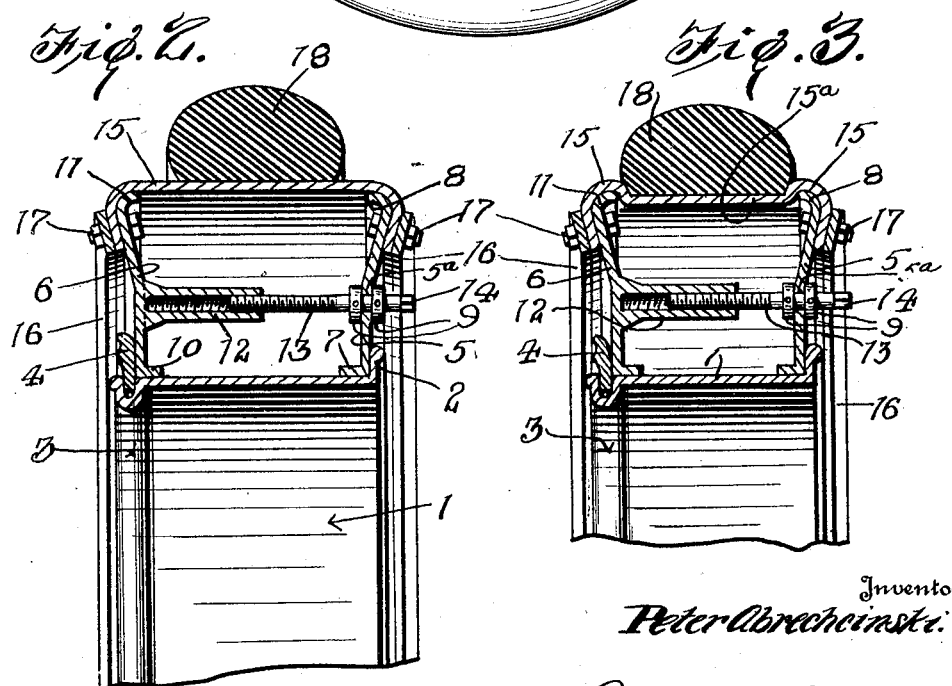
Inventor
Peter Abrechcinski
By Bryant & Lowry
Attorneys Patented Sept. 18, 1928.

1,685,013

UNITED STATES PATENT OFFICE.

PETER ABRECHCINSKI, OF BUFFALO, NEW YORK.

AUTOMOBILE TIRE.

Application filed August 18, 1927. Serial No. 213,901.

The primary object of the present invention is to provide an automobile tire of the cushion type possessing the resiliency of the usual pneumatic tire and embodies a solid cushion tire tread carried by a flexible band that is attached to the outer edge of a rim member.

A further object of the invention is to provide an automobile tire of the type above set forth wherein the flexible band is carried by expansible rim members for placing the band in a taut condition for more effectively supporting the cushion tread.

With the above general objects in view and others that will appear as the nature of the invention is better understood, the same consists of the novel form, combination and arrangement of parts hereinafter more fully described, shown in the accompanying drawings and claimed.

In the drawings, wherein like reference characters designate corresponding parts throughout the several views, Fig. 1 is a side elevational view of an automobile tire and demountable rim constructed in accordance with the present invention, Fig. 2 is a cross sectional view taken on line 2—2 of Fig. 1 showing the laterally stretched flexible band supporting the cushion tire and the expansible rim members, and Fig. 3 is a cross sectional view, similar to Fig. 2, wherein the inner side of the cushion tire and flexible band supporting the same is partially set between the outer edges of the expansible rim members.

Referring more in detail to the accompanying drawings, and particularly to Fig. 2 there is illustrated an automobile tire and rim comprising an annular rim band 1 having an outwardly directed side flange 2 upon one side thereof, while the other side of the rim band carries an inwardly directed grooved bead 3. A retaining ring 4 is associated in the usual manner with the grooved bead 3.

A pair of rim members 5 and 6 are supported upon the rim band 1, the rim member 5 being of annular ring formation and having an angular foot 7 at its inner edge resting upon the rim band 1 and moved into engagement with the flange 2 while the outer edge of the rim member 5 is curved inwardly at 8. For purposes presently to appear, the rim member 5 is provided with a plurality of spaced openings 5ª.

The rim member 6 also being of ring formation is provided at its inner edge with an angle foot 10 resting upon the rim band 1 and engaged by the retaining ring 4 is curved inwardly at its outer edge as at 11. Internally threaded socket members 12 project outwardly from the inner side of the rim member 6 at spaced points and respectively alined with the screw blocks 9 for the reception of screw bolts 13 extending through the openings 5ª and entering the threaded socket members 12, the screw bolts 13 being provided with wrench receiving portions 14 at their outer ends. Disks 9 secured to the bolt 13 at opposite sides of the rim member 5 form a swivel support for the bolt.

The tire structure comprises a flexible band 15 having its opposite side edges turned over the inwardly curved outer edges 8 and 11 of the rim members 5 and 6 with the outer edges of the flexible band engaged by the rings 16 with the flexible band and rings secured to the rim members 5 and 6 by the screw bolts 17, as clearly shown in Figure 2.

In mounting the tire upon the rim band 1, it being noted that the flexible band 15 carrying the solid cushion tread 18 intermediate its side edges and permanently connected thereto in any convenient manner is carried by the rim members 5 and 6 and said rim members are placed on the rim band 1, and after which, the retaining ring 4 is mounted in the grooved bead 3. Upon operating the screw bolts 13 by applying a suitable wrench to the outer ends 14 thereof, the rim members 5 and 6 are separated or extended in opposite directions to laterally stretch the flexible band 15 and place the same in a taut condition for the better support of the cushion tire tread 18. The resiliency of the tire may be varied by the adjustment of the rim members 5 and 6. As illustrated in Fig. 3, the flexible band 15 is of a width to permit the formation of a pocket 15ª therein after the flexible band has been laterally stretched to its limit by the expansible rim members 5 and 6 so that increased resiliency or cushioning properties will be accorded the tire and to provide a tire possessing increased shock absorbing characteristics.

From the above detailed description of the device, it is believed that the construction and operation thereof will at once be apparent, and while there are herein shown and described the preferred embodiments of the present invention, it is nevertheless to be understood that minor changes may be made therein without departing from the spirit and scope of the invention as claimed.

What is claimed is:—

1. In an automobile tire of the type described, a rim band, side rim members mounted on the band, a flexible band at the outer edges of the rim members, a cushion tire carried by the flexible band, and means for spacing the rim members to transversely stretch the flexible band.

2. In an automobile tire of the type described, a rim band, side rim members mounted on the band, a flexible band at the outer edges of the rim members, a cushion tire carried by the flexible band, means for spacing the rim members to transversely stretch the flexible band, the opposite side edges of the flexible band overlapping the outer edges of the rim members, rings engaging the overlapping side edges, and means for attaching the rings and band edges to the outer edges of the rim members.

3. In an automobile tire of the type described, a flexible band, a solid cushion tire fixed to the outer side of the band and rim members attached to the opposite edges of the band to be moved away from each other to transversely stretch the band.

In testimony whereof I affix my signature.

PETER ABRECHCINSKI.